United States Patent Office 2,903,457
Patented Sept. 8, 1959

2,903,457
ISOMER OF CYCLOHEXIMIDE AND PROCESS

Jared H. Ford, Kalamazoo Township, Kalamazoo County, Mich., assignor to The Upjohn Company, Kalamazoo, Mich., a corporation of Michigan No Drawing. Application January 22, 1957
Serial No. 635,142

3 Claims. (Cl. 260—281)

This invention relates to a composition of matter and to a process for making the same and is particularly directed to an isomer of cycloheximide and to a process for making the same.

Cycloheximide is an antibiotic substance produced as the elaboration product of *Streptomyces griseus* according to procedure set forth in U. S. Patents 2,574,519 and 2,612,502; by Leach et al. in J. Am. Chem. Soc. 69, 474 (1947); and by Ford et al. in J. Am. Chem. Soc. 70, 1123–1125 (1948). It has been shown by Kornfeld et al., J. Am. Chem. Soc. 71, 150–159 (1949), to have the following structure:

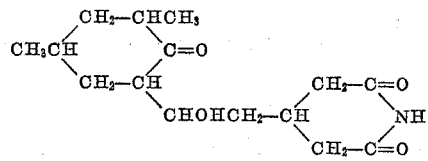

It has a melting point of 116–117 degrees centigrade (Kornfeld et al. report a slightly higher melting point) and an optical rotation $[\alpha]_D^{23}$=minus 3.0 degrees (c.=10, methanol). It has been found to have high activity against certain fungal organisms and little, if any, activity against bacteria.

The present invention is directed to an isomer of cycloheximide, hereinafter referred to as isocycloheximide, and to a method for making the same. This new product is useful as a fungicide for the control of fungal diseases of plants and animals. It is also useful as an industrial fungicide, for example, for inhibiting secondary fermentation in wine. It is particularly useful for the control of plant fungal infections such as cherry leaf spot and apple scab because, unlike cycloheximide, it is translocated in the foliage and protects new growth as well as old.

Cycloheximide is very soluble in partially chlorinated methane solvents such as chloroform and methylene chloride and is recovered from fermentation beers by the use of these solvents. The fermentation beer containing the cycloheximide can be extracted directly with the solvent, or the cycloheximide can first be adsorbed on charcoal, eluted therefrom with acetone, and recovered as an aqueous concentrate by evaporating the acetone. This aqueous concentrate is then extracted with the partially chlorinated methane solvent. The cycloheximide is then recovered from the resulting solution, with or without one or more solvent transfers and decoloration of the solutions with decolorizing carbon, and recrystallized from a solvent in which the cycloheximide has restricted solubility. Suitable solvents for this purpose include amyl acetate, ethyl acetate, isopropanol, n-butanol, and mixtures of petroleum ether with chloroform, methylene chloride, or diethyl ether.

It has now been found that the aged mother liquors from the recrystallization of cycloheximide contain isocycloheximide, and that the isocycloheximide can be obtained by evaporating the aged mother liquors from cycloheximide recrystallizations, extracting the residue with a partially chlorinated methane solvent, evaporating the partially chlorinated methane solvent, and recrystallizing the residue from a recrystallizing solvent such as those enumerated above, advantageously amyl acetate or isopropanol. One or more or all of the solutions can be treated with decolorizing carbon to improve the color of the product. Products having sharp melting points around 100 degrees centigrade and specific rotations between plus 12 and 36 degrees (methanol) are thus obtained.

The presence of isocycloheximide in the aged mother liquors from the recrystallization of cycloheximide is believed due to an isomerization that takes place changing cycloheximide to isocycloheximide during the aging of the mother liquors. In any event it has not been possible to isolate isocycloheximide from the fermentation beers from which the cycloheximide is isolated nor from the unaged mother liquors of the recrystallization of cycloheximide. Thus there is no evidence that isocycloheximide is an elaboration product of the organism that elaborates cycloheximide.

The same type of isomerization has been noted in solutions of purified cycloheximide stored for long periods.

It has been further found that isocycloheximide can be obtained by contacting cycloheximide with acid-deactivated adsorbent alumina. It appears that the acid-deactivated adsorbent alumina accelerates the equilibration of cycloheximide and isocycloheximide. In any event on the treatment of cycloheximide with acid-deactivated adsorbent alumina, a mixture of isomers is obtained from which a material can be recovered that is identical with the isocycloheximide that is recovered from the aged mother liquors from the recrystallization of cycloheximide.

Isocycloheximide has distinctly different properties from cycloheximide. Thus whereas cycloheximide has high activity against *Saccharomyces pastorianus*, isocycloheximide has low activity against this organism. Thus the products assay about one-third or less the activity of cycloheximide on the *S. pastorianus* plate assay. Moreover, isocycloheximide is highly active against *Coccomyces hiemalis*, an organism causing cherry leaf spot, and unlike cycloheximide is translocated in the foliage so that new growth occurring after the trees have been sprayed is protected as well as the old growth to which the spray was applied.

The mixture of isomers obtained by the isomerization of cycloheximide according to the invention can be used as such or can be treated to recover the isocycloheximide therefrom. Separation of the two isomers, cycloheximide and isocycloheximide, can be effected by the usual separation methods such as recrystallization, adsorption and partition chromatography, countercurrent distribution, and the like. In some cases successive solvent transfers with decoloration followed by one or more recrystallizations will serve. Any of the processes if carried out properly are capable of producing an analytical sample.

The following examples are illustrative of the processes and products of this invention and are not to be contrued as limiting. The parts are by weight if not otherwise specified.

EXAMPLE 1

Miscellaneous mother liquor filtrates from the crystallization of cycloheximide with amyl acetate according to the procedure of Example 2 of U.S. Patent 2,612,502 and Leach et al., supra, which filtrates had been aged at 5–10 degrees centigrade, some of them for periods as long as eighteen months, were reprocessed. The amyl acetate was distilled in vacuo. Water was added to the residue and the remaining amyl acetate was removed as the water azeotrope. The residue was extracted with chloroform, the solution was treated with carbon to effect a partial decolorization, and the chloroform was distilled in vacuo. Ninety-nine percent isopropyl alcohol was added and the distillation was continued until the specific gravity of the distillate equaled that of the isopropyl alcohol. The resulting solution, twenty liters, contained 345 milligrams of solids per milliliter and dioassays indicated a cycloheximide activity of 84 milligrams per milliliter. On standing at 5–10 degrees centigrade for three months, a heavy deposit of crystals formed on the walls of the bottle. These were filtered and washed with isopropyl alcohol and dried in vacuo at sixty degrees centigrade. There was obtained 1218 grams of crystals having a melting point of 100–102 degrees centigrade and assaying 26 percent of the activity of cycloheximide by the *S. pastorianus* plate assay and having a specific rotation $[\alpha]_D^{25}$=plus 26 degrees (c.=5, methanol.

EXAMPLE 2

A. Recrystallization of 150 grams of the crude solid from Example 1 from 300 milliliters of amyl acetate gave 109 grams of crystals, melting point 98–100 degrees. This was recrystallized from 600 milliliters of 99 percent isopropyl alcohol, using eleven grams of decolorizing carbon to decolorize. The resulting white crystals of isocycloheximide (first crop) melted at 101–102 degrees, $[\alpha]_D^{23}$=plus 36 degrees (c.=10, methanol); yield, 51.9 grams. *S. pastorianus* plate assays indicate that it is twenty to thirty percent as active as cycloheximide.

Analysis.—Calcd. for $C_{15}H_{23}NO_4$: C, 64.02; H, 8.24. Found: C, 63.92, 64.20; H, 7.97, 8.11.

B. The second crop yielded 30.3 grams of crystals melting at 98–100 degrees centigrade and having an $[\alpha]_D^{23}$ of +32.1 degrees (c.=10, methanol).

EXAMPLE 3

A solution of pure cycloheximide having a melting point of 116–117 degrees centigrade was prepared by dissolving twenty grams of cycloheximide in sufficient 95 percent aqueous ethanol to make 200 milliliters and diluting the resulting solution to 400 milliliters with double distilled water. A fresh solution so prepared has a specific rotation $[\alpha]_D^{23}$ of plus 0.5 degree.

On standing at room temperature for eighteen months, the optical rotation increased to $[\alpha]_D^{23}$=plus twelve degrees.

EXAMPLE 4

*Isomerization of cycloheximide on acid-deactivated adsorbent alumina*

A. Acid-deactivated adsorbent alumina was prepared by suspending one hundred grams of an active (adsorbent) alumina in 200 milliliters of benzene, treating with from about six milliliters of ten percent aqueous acetic acid, shaking for three hours, and storing about fifteen hours at room temperature. The resulting acid-deactivated adsorbent alumina was stirred to a slurry and poured into a two-centimeter Pyrex glass tube and allowed to settle at atmospheric pressure until a column of adsorbent about 25 centimeters long had been formed. Then four grams of cycloheximide which had been dissolved in twenty milliliters of benzene was adsorbed thereon. After an interval of three hours at room temperature, the column was eluted with 400 milliliters of chloroform. The chloroform was evaporated leaving a mixture of cycloheximide and isocycloheximide which weighed 0.035 gram. It gave a melting point at 82–92 degrees centigrade and specific rotation $[\alpha]_D$=plus 28 degrees (methanol). The material gave 92 percent in vivo control of *Alternaria solani*, and was 35 percent as active as pure cycloheximide in bioassay with *S. pastorianus* and contained about eighty percent isocycloheximide.

Analysis.—Calcd. for $C_{15}H_{23}NO_4$: C, 64.02; H, 8.24; N, 4.89. Found: C, 65.10; H, 7.98; N, 5.08.

B. A further elution of the column of Example 4A with 1.5 liters of chloroform and evaporation of solvent as above gave 0.8 gram of product. The melting point was at 60–78 degrees centigrade and specific rotation $[\alpha]_D$=plus 20 degrees (methanol). This preparation gave 51 percent control of *S. pastorianus* which indicates about sixty percent of isocycloheximide.

Analysis.—Calcd. for $C_{15}H_{23}NO_4$: C, 64.03; H, 8.24; N, 4.89. Found: C, 63.67; H, 8.37; N, 5.02.

By countercurrent distribution using a mixture of benzene, methanol and water (10:5:1 by volume) there was obtained a fraction having a melting point of 87–93 degrees centigrade which had the infrared spectrum of isocycloheximide (Example 2) and gave no depression of the melting point when mixed therewith.

It is to be understood that the invention is not to be limited to the exact details of operation or exact compounds shown and described, as obvious modifications and equivalents will be apparent to one skilled in the art, and the invention is therefore to be limited only by the scope of the appended claims.

This application is a continuation-in-part of application Serial No. 572,230, filed March 19, 1956, and now abandoned.

I claim:

1. A compound having the structural formula:

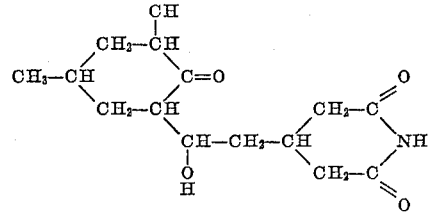

and in its substantially pure crystalline form a specific rotation, $[\alpha]_D^{23}$, of about 36 degrees (c.=10, methanol), a melting point of about 100 to 102 degrees centigrade, and about 20–30 percent of the activity of cycloheximide against *Saccharomyces pastorianus*.

2. A compound according to claim 1 in crystalline and substantially pure form, and substantially free from cycloheximide.

3. A process for preparing an isomer of cycloheximide, said isomer being characterized by, in its substantially pure crystalline form, a specific rotation, $[\alpha]_D^{23}$, of about 36 degrees (c.=10, methanol), a melting point of about 100 to 102 degrees centigrade, and about 20 to 30 percent of the activity of cycloheximide against *Saccharomyces pastorianus* which comprises maintaining cycloheximide in a solvent therefor until a substantial amount of said isomer is formed, and recovering the said isomer from the solution essentially free of cycloheximide.

References Cited in the file of this patent

UNITED STATES PATENTS

| | | |
|---|---|---|
| 2,574,519 | Whiffen et al. | Nov. 13, 1951 |
| 2,612,502 | Leach | Sept. 30, 1952 |

OTHER REFERENCES

Ford: Jour. Am. Chem. Soc., vol. 70, pp. 1223–5 (1948).